United States Patent
Gosalia

(10) Patent No.: US 10,535,057 B2
(45) Date of Patent: Jan. 14, 2020

(54) PERFORMING TRANSACTIONS WHEN DEVICE HAS LOW BATTERY

(71) Applicant: PayPal, Inc., San Jose, CA (US)

(72) Inventor: Jigar Rajnikant Gosalia, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 72 days.

(21) Appl. No.: 15/717,538

(22) Filed: Sep. 27, 2017

(65) Prior Publication Data

US 2019/0095901 A1    Mar. 28, 2019

(51) Int. Cl.
*G06Q 20/32*    (2012.01)
*G06Q 20/40*    (2012.01)

(52) U.S. Cl.
CPC ........... *G06Q 20/322* (2013.01); *G06Q 20/32* (2013.01); *G06Q 20/401* (2013.01)

(58) Field of Classification Search
USPC ......................................................... 705/44
See application file for complete search history.

(56) References Cited

U.S. PATENT DOCUMENTS

| | | | | |
|---|---|---|---|---|
| 2012/0239417 A1* | 8/2012 | Pourfallah | ............. | G06Q 20/36 705/2 |
| 2012/0276852 A1* | 11/2012 | Gosset | ................... | H04W 4/02 455/41.2 |
| 2015/0026057 A1* | 1/2015 | Calman | .............. | G06Q 20/3223 705/42 |
| 2015/0046324 A1* | 2/2015 | de la Cropte de Chanterace | | G07F 7/0873 705/41 |
| 2017/0032366 A1* | 2/2017 | Kumar | ................. | G06Q 20/382 |

FOREIGN PATENT DOCUMENTS

| | | | | |
|---|---|---|---|---|
| CN | 103577982 A | * | 2/2014 | ......... G06Q 20/3278 |
| WO | 2002009254 A2 | | 1/2002 | |
| WO | 2002058417 A1 | | 7/2002 | |

OTHER PUBLICATIONS

CN-103577982-A translation 2014 (Year: 2014).*

* cited by examiner

*Primary Examiner* — Abhishek Vyas
*Assistant Examiner* — Paul S Schwarzenberg
(74) *Attorney, Agent, or Firm* — Haynes and Boone LLP

(57) ABSTRACT

In response to detecting that a battery level of a first computing device is below a threshold level, a computer system determines that a second computing device is within a threshold distance of the first computing device. In response to the determining that the second computing device is within the threshold distance of the first computing device, the computer system creates a reference identifier (ID) and transmits information corresponding to the reference ID to the second computing device. In response to detecting a usage of the information corresponding to the reference ID by the second computing device, the computer system transmits a request for authentication information. In response to determining that authentication is successful, the computer system transmits a payment from an account associated with a user of the first computing device to an account associated with a recipient.

20 Claims, 5 Drawing Sheets

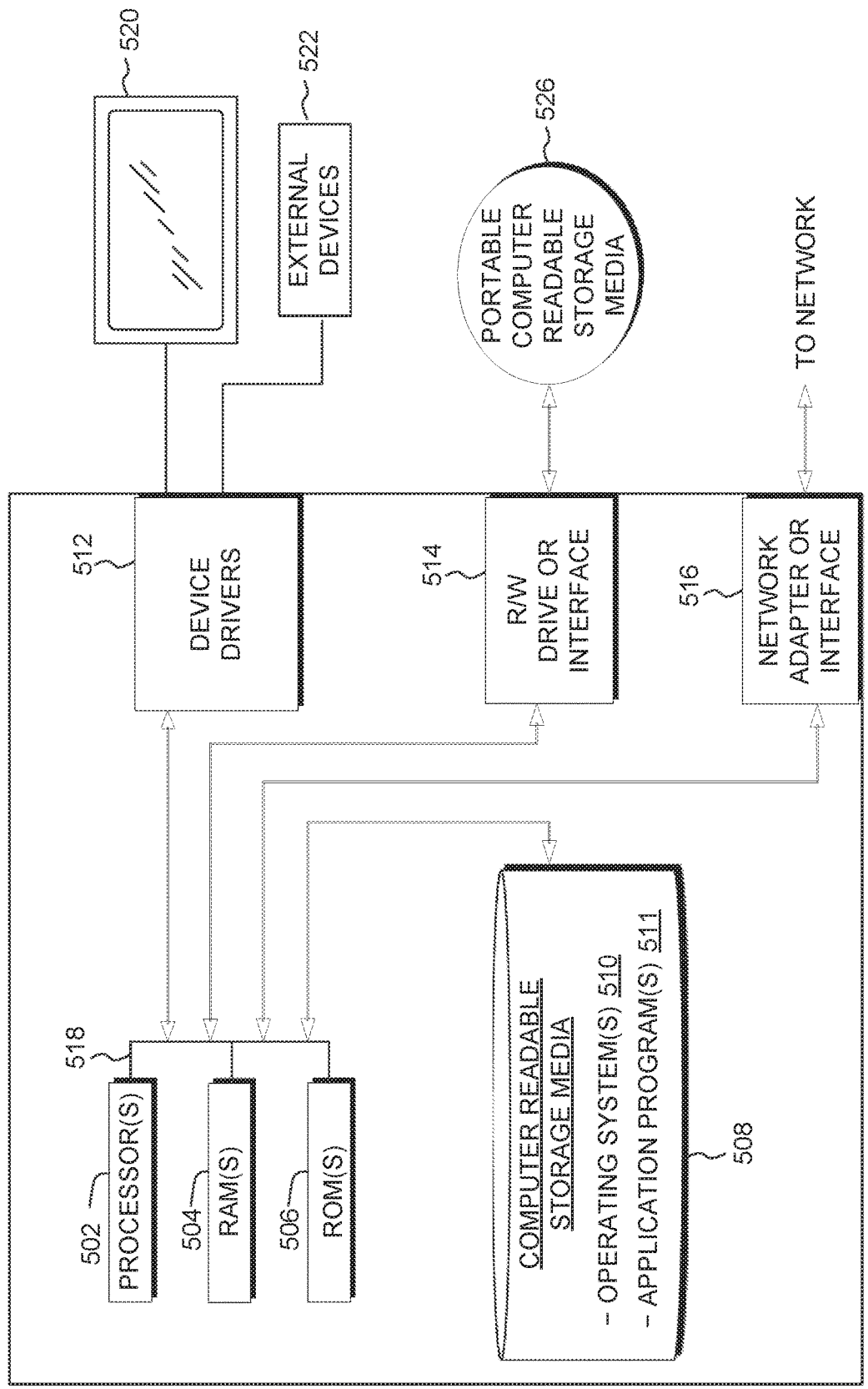

PERFORMING TRANSACTIONS WHEN DEVICE HAS LOW BATTERY

TECHNICAL FIELD

The present disclosure relates generally to detecting a battery level on a device is below a threshold level, and more particularly to a system for performing a transaction upon detection of the battery level being below the threshold level.

BACKGROUND

Today, with the amount of applications present on a device, such as a smartphone, and further with the number of applications we like to run on our devices, maintaining a sufficient battery level can be a constant struggle. In many cases, we forget to charge our devices and then end up in a situation where we need to utilize our devices or smartphones for a particular task and are unable to. It would be advantageous if there was a system that allowed us to perform certain tasks even when our smartphones are running out or are out of battery.

BRIEF DESCRIPTION OF THE DRAWINGS

FIG. 5 is a block diagram depicting the hardware components of the battery system of FIG. 1, in accordance with an embodiment.

DETAILED DESCRIPTION

Figure 1:
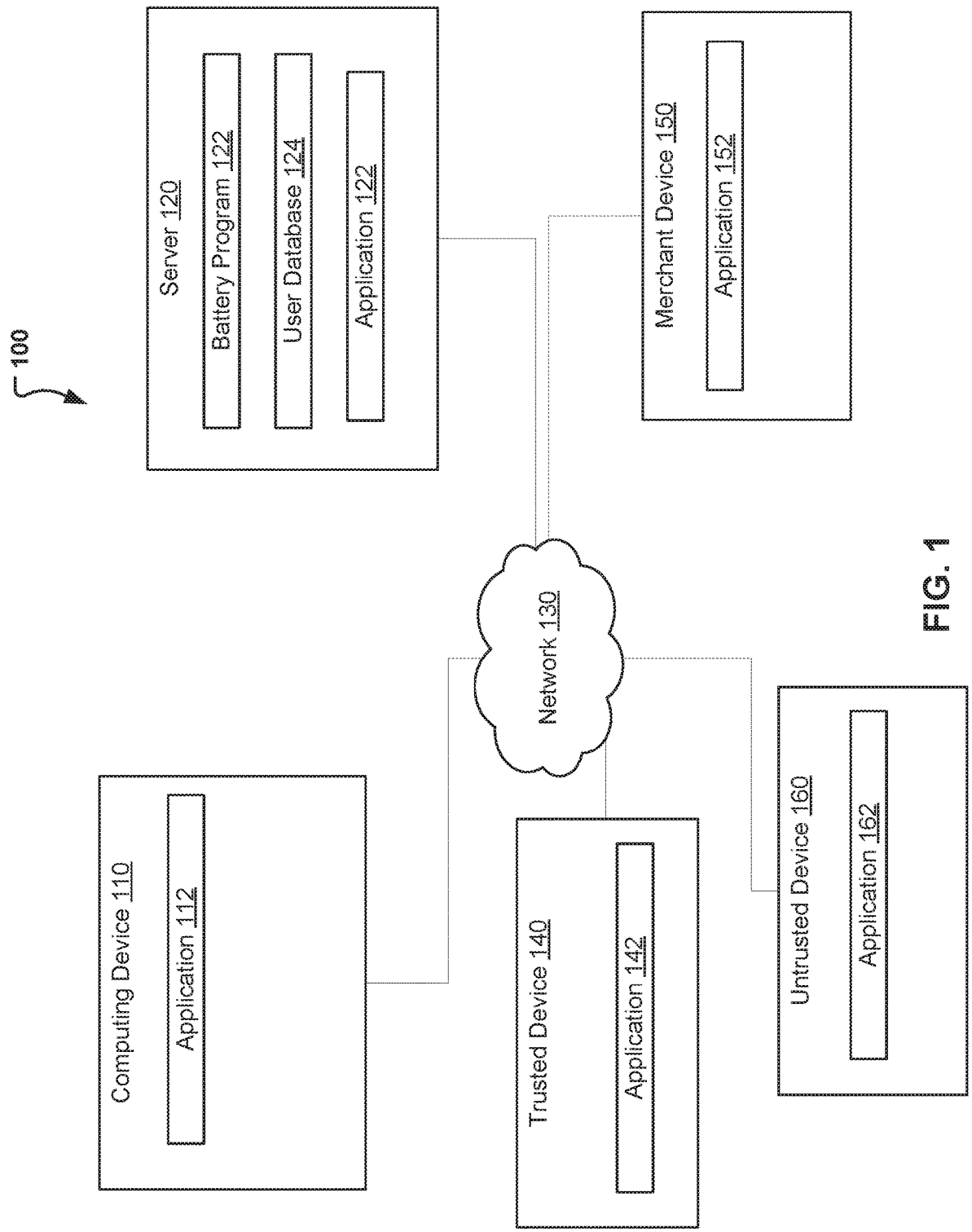
FIG. 1 illustrates a battery level system, in accordance with an embodiment.

Embodiments of the present disclosure provide a system, method, and program product. A computer system detects that a battery level of a first computing device is below a threshold level. In response to detecting that the battery level of the first computing device is below the threshold level, a computer system determines that a second computing device is within a threshold distance of the first computing device. In response to the determining that the second computing device is within the threshold distance of the first computing device, the computer system creates a reference identifier (ID) and transmits information corresponding to the reference ID to the second computing device. In response to detecting a usage of the information corresponding to the reference ID by the second computing device, the computer system transmits a request for authentication information. The computer system receives authentication information from the second computing device. In response to determining that authentication is successful, the computer system transmits a payment from an account associated with a user of the first computing device to an account associated with a recipient.

In another embodiment, a computer system detects that a battery level of a first computing device is below a threshold level. In response to the detecting that the battery level of the first computing device is below the threshold level, the computer system creates a reference identifier (ID) and transmitting information corresponding to the reference ID to a merchant device. In response to detecting a usage of the information corresponding to the reference ID by the merchant device, the computer system transmits an authentication message to a trusted device of the first computing device. In response to determining that authentication is successful, the computer system transmits a payment from an account associated with a user of the first computing device to an account associated with the merchant device.

In the example embodiment, the present disclosure describes a solution that allows a user to utilize a digital application to complete a transaction even when a device of the user is about to or has run out of battery power. In the example embodiment, the present disclosure describes a solution that detects a battery level of a user device is below a threshold level. Based on detected that the battery level of the user device is below the threshold level, the present solution describes determining whether a trusted device is within a threshold distance of the user device, and based on determining that a trusted device is within the threshold distance of the user, the present disclosure describes causing transmission of a reference identifier (ID) to the trusted device, and further causing a payment page to load on the trusted device. Based on determining that a trusted device is not within the threshold distance of the user device, the present disclosure describes causing transmission of the reference ID to an untrusted device that is within a threshold distance of the user device, and further causing the payment page to load on the untrusted device. The present disclosure further describes causing a payment to be made to a merchant in response to determining that a successful authentication has been performed.

In the example embodiment, the present disclosure further describes a solution that includes based on determining that the battery level of the user device is below the threshold level, causing transmission of a reference ID to a merchant device. The present disclosure further describes transmitting an authentication message to a trusted device, and based on authenticating, causing a payment to be made to the merchant.

Embodiments of the present disclosure will now be described in detail with reference to the accompanying Figures.

FIG. 1 illustrates battery level system 100, in accordance with an embodiment. In the example embodiment, battery level system 100 includes computing device 110, computing device 140, merchant device 150, and server 120 all interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing devices, such as between computing device 110 and server 120.

Computing device 110 includes application 112. In the example embodiment, computing device 110 is a computing device such as a smartphone, however in other embodiments, computing device 110 may be a desktop computer, a laptop computer, a tablet computer, a handheld device, a thin client, or any other electronic device or computing system capable of receiving and sending data to and from other computing devices, such as server 120, via network 130. Computing device 110 is described in more detail with reference to FIG. 6.

In the example embodiment, application 112 is a client side application corresponding to server side application 122 located on server 120. In the example embodiment, application 112 is a financial software application, however, in other embodiments; application 112 may be a social media application or another type of application that includes, is integrated, or is associated with functionality that supports the performance of a financial transaction. Application 112 is described in further detail with regard to FIGS. 2 through 5.

Trusted device 140 includes application 142. In the example embodiment, trusted device 140 is a computing device such as a smartphone, however in other embodiments, trusted device 140 may be a desktop computer, a laptop computer, a tablet computer, a handheld device, a thin client, or any other electronic device or computing system capable of receiving and sending data to and from other computing devices, such as server 120, via network 130. Furthermore, in the example embodiment, trusted device 140 is a trusted device of computing device 110. Trusted device 140 is described in more detail with reference to FIG. 6.

In the example embodiment, application 142 is a client side application corresponding to server side application 122 located on server 120. In the example embodiment, application 142 is a financial software application, however, in other embodiments; application 142 may be a social media application or another type of application that includes, is integrated, or is associated with functionality that supports the performance of a financial transaction. Application 142 is described in further detail with regard to FIGS. 2 through 5.

Untrusted device 160 includes application 162. In the example embodiment, untrusted device 160 is a computing device such as a smartphone, however in other embodiments, untrusted device 160 may be a desktop computer, a laptop computer, a tablet computer, a handheld device, a thin client, or any other electronic device or computing system capable of receiving and sending data to and from other computing devices, such as server 120, via network 130. Furthermore, untrusted device is not a trusted device of computing device 110. Untrusted device 160 is described in more detail with reference to FIG. 6.

In the example embodiment, application 162 is a client side application corresponding to server side application 122 located on server 120. In the example embodiment, application 162 is a financial software application, however, in other embodiments; application 162 may be a social media application or another type of application that includes, is integrated, or is associated with functionality that supports the performance of a financial transaction. Application 162 is described in further detail with regard to FIGS. 2 through 5.

Merchant device 150 includes application 152. In the example embodiment, merchant device 150 is a computing device such as a beacon device, however in other embodiments, merchant device 150 may be a desktop computer, a laptop computer, a tablet computer, a handheld device, a smartphone, a thin client, or any other electronic device or computing system capable of receiving and sending data to and from other computing devices, such as server 120, via network 130. Merchant device 150 is described in more detail with reference to FIG. 6.

In the example embodiment, application 152 is a client side application corresponding to server side application 122 located on server 120. In the example embodiment, application 152 is a financial software application, however, in other embodiments; application 152 may be a social media application or another type of application that includes, is integrated, or is associated with functionality that supports the performance of a financial transaction. Application 152 is described in further detail with regard to FIGS. 2 through 5.

Server 120 includes battery program 122, user database 124, and application 122. In the example embodiment, server 120 may be a desktop computer, a laptop computer, a tablet computer, a mobile device, a handheld device, a thin client, or any other electronic device or computing system capable of receiving and sending data to and from other computing devices, such as computing device 110, via network 130. Although not shown, optionally, server 120 can comprise a cluster of servers executing the same software to collectively process requests as distributed by a front-end server and a load balancer. In the example embodiment, server 120 is a server that supports application 122. Server 120 is described in more detail with reference to FIG. 6.

In the example embodiment, application 122 is a server side application corresponding to one or more client side applications. In the example embodiment, application 122 is a financial software application, however, in other embodiments; application 122 may be a social media application or another type of application that includes, is integrated, or is associated with functionality that supports the performance of a financial transaction. Application 122 is described in further detail with regard to FIGS. 2 through 5.

In the example embodiment, user database 124 is a database that includes account information corresponding to client-side users of application 122 (such as the user of computing device 110). Furthermore, in the example embodiment, user database 124 includes one or more trusted devices associated with each user account and/or client-side user device. For example, user database 124 may include a record corresponding to the user of computing device 110, and may further list trusted device 140 as a trusted device associated with the user of computing device 110. User database 124 is described in more detail with reference to FIGS. 2 through 5.

Battery program 122 is a software program capable of detecting a battery level corresponding to a client-computing device, such as computing device 110. Furthermore, based on detecting that the battery level for the client-computing device is below a threshold level, battery program 122 is capable of determining whether a trusted device is within a threshold distance of the client-computing device. Furthermore, based on determining that the trusted device is within the threshold distance of the client-computing device, battery program 122 is capable of creating a reference ID that includes client user information and further transmitting the reference ID to a trusted device associated with the client-computing device. In one or more embodiments, the reference ID may be a numeric, alpha-numeric, tiny uniform resource locator (URL), or a similar identifier. In addition, responsive to the reference ID being input in a client-side application of the trusted device or a selectable link corresponding to the reference ID being selection, battery program 122 is capable of causing a payment page to be loaded on the trusted device. Furthermore, battery program 122 is capable of verifying authentication credentials corresponding to the user of the client-computing device received from the trusted device and based on the verification, causing payment to be made. In addition, based on determining that a trusted device is not within the threshold distance of the client-computing device, battery program 122 is capable of causing the reference ID to be transmitted to an untrusted computing device, and causing the payment page to be loaded on the untrusted device, in a similar manner as described above. Furthermore, in response to receiving authentication information corresponding to the user of the client-computing device and verifying the information, battery program 122 is capable of causing a payment to be made. The operations of battery program 122 are described in further detail with regard to FIGS. 2 through 5.

Figure 2:
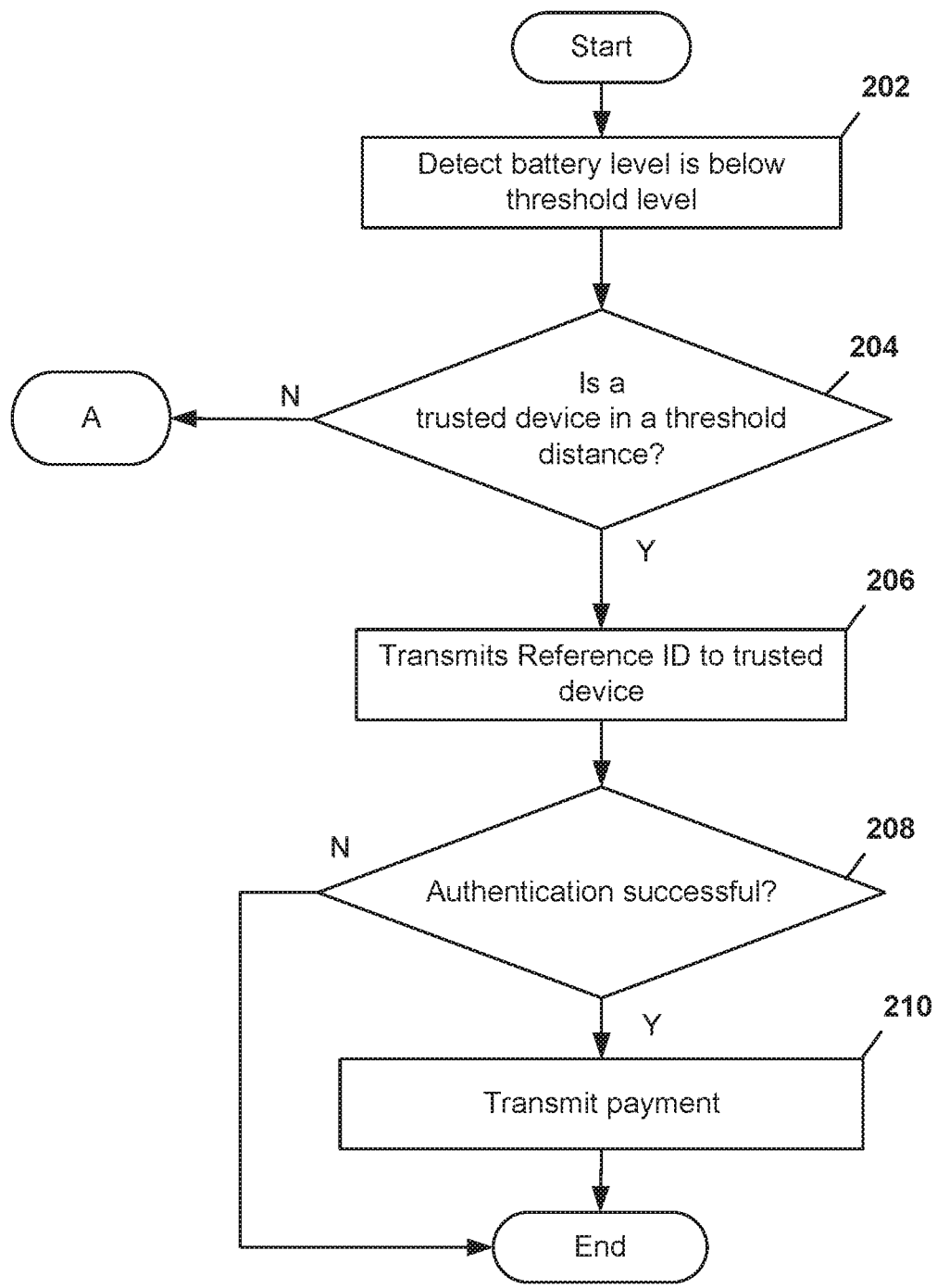
FIGS. 2 and 3 is a flowchart illustrating the operations of the battery program of FIG. 1 in determining that a battery level for a device is below a threshold level, and creating and causing transmission of a Reference ID to another device, in accordance with an embodiment.
Figure 3:
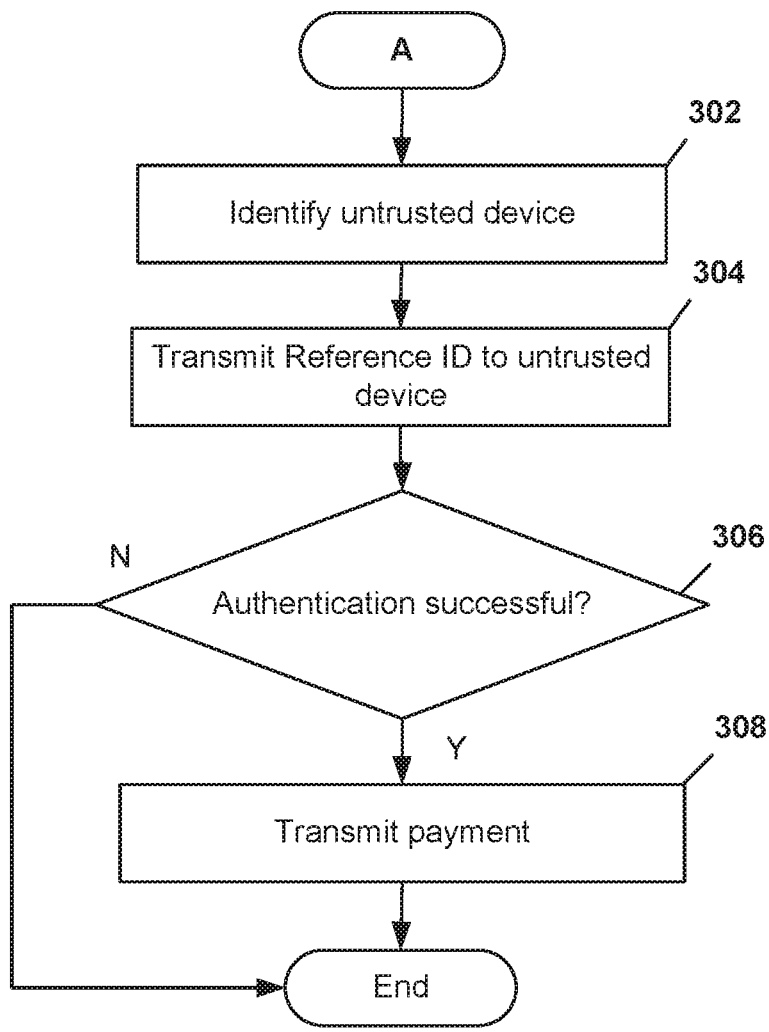

FIGS. 2 and 3 is a flowchart illustrating the operations of battery program 122 in determining that a battery level for a device is below a threshold level, and creating and causing transmission of a Reference ID to another device, in accordance with an embodiment. In the example embodiment, battery program 122 detects that computing device 110 has a battery level that is below a threshold level (step 202). In the example embodiment, battery program 122 may utilize (communicate with) an application, such as application 112 to monitor the battery level of computing device 110. In the example embodiment, the threshold level may be 5%, however, in other embodiments; the threshold level may be a different threshold level.

In the example embodiment, battery program 122 determines whether a trusted device corresponding to computing device 110 is within a threshold distance of computing device 110 (decision 204). In the example embodiment, battery program 122 utilizes a GPS component on computing device 110 to identify a location of computing device 110, and may further utilize communication capabilities of computing device 110 to determine computing devices within a threshold distance of computing device 110. Battery program 122 may cross-reference an identifier (such as an account identifier) corresponding to each computing device within the threshold distance of computing device 110 with user database 124 to determine if any of the computing devices are trusted devices of computing device 110. In other embodiments, computing devices, upon entering a merchant location, may communicate with a merchant device or merchant beacon, such as merchant device 150. In this other embodiment, battery program 122 may communicate with merchant device 150 to identify the computing devices that are currently within the threshold distance of computing device 110 (by way of determining the computing devices that are within the merchant location or a specific portion of a merchant location, such as a women's department of a department store). Battery program 122 may cross-reference identifier associated with the computing devices within the merchant location (or a specific portion of the merchant location) to user database 124 to determine whether any of the computing devices are trusted devices of computing device 110. In further embodiments, battery program 122 may identify trusted devices associated with computing device 110, and then identify whether the trusted devices are within the threshold distance of computing device 110 by communicating with a GPS component on each device. Furthermore, in the example embodiment, there may be a hierarchy of trusted devices associated with the user of computing device 110 in user database 124. Therefore, if battery program 112 determines that more than one trusted device is within the threshold distance of computing device 110, battery program 112 may reference the hierarchy of trusted devices associated with user of computing device 110, and identify which trusted device (located within the threshold distance) has the highest hierarchical ranking.

If battery program 122 determines that a trusted device is within the threshold distance of computing device 110 (decision 204, "YES" branch), battery program 122 creates a reference ID corresponding to an account of the user of computing device 110, and further transmits the reference ID to the trusted device (step 206). In the example embodiment, the reference ID includes information corresponding to an account of the user of computing device 110, and may further include a spending limit (or available amount of transactional currency), a location of computing device 110, along with a location where the amount may be spent (for example, a specific merchant, a merchant location, and/or merchant account information). Furthermore, in the example embodiment, battery program 122 may transmit the reference ID in the form of a selectable element (or link), which upon selection, causes a payment page or interface to load that corresponds to the account of the user of computing device 110. In one or more embodiments, the selectable element/link may be encrypted. In other embodiments, battery program 122 may transmit the reference ID to a trusted device, such as trusted device 140, which may then be input into an interface of application 142, which causes the payment page or interface corresponding to the account of the user of computing device 110 to load. In this other embodiment, when the reference ID is input into the interface of application 142, application 122 receives the reference ID and communicates the reception of the reference ID with battery program 122. Battery program 122 may then transmit information to trusted device 140 to cause the payment page/interface corresponding to the account of the user of computing device 110 to load. In the example embodiment, the payment page/interface may include information such as an identification information corresponding to the account of the user of computing device 110, such as a name, or address, and further may include information corresponding to a spending limit, and a specific merchant where the available funds may be utilized.

Battery program 122 may receive authentication information and further determine if the authentication is successful (decision 208). In the example embodiment, the payment page/interface may provide a prompt for certain credentials corresponding to the account of the user of computing device 110 to be input. For example, the payment page/interface displayed on trusted device 140 may prompt for a user pin or password to be input. Battery program 122 may then cross-reference the input authentication information with information corresponding to the account of the user of computing device 110 in user database 124 to determine if the input authentication information matches the information in user database 124. If battery program 122 determines that the input authentication information does not match the information in user database 124 (authentication is not successful) (decision 208, "NO" branch), battery program 122 may deny access to the funds corresponding to the reference ID (displayed on the payment page/interface), and may further disallow access to the payment page/interface. In other embodiments, battery program 122 may prompt for the authentication information to be re-entered, and then re-evaluate whether the newly input information matches the information in user database 124.

If battery program 122 determines that the input authentication information matches the information in user database 124 (authentication is successful) (decision 208, "YES" branch), battery program 122 transmits payment to a specified merchant or recipient account (step 210). In the example embodiment, along with input of the authentication information, battery program 122 may additionally prompt for information regarding the amount of the available amount (the spending limit) desired to be used for the payment. In other embodiments, battery program 122 may upon determining that authentication is successful, transmit payment for the entire amount corresponding to the spending limit. In the example embodiment, battery program 122 may communicate with computing device 110 with regard to a specific merchant for battery program 122 to perform payment to when the battery level of computing device 110 is detected below the threshold level. For example, battery program 122 may receive information corresponding to a specific merchant, or may utilize GPS information or location information to identify that computing device 110 is in a location corresponding to the specific merchant. In other embodiments, battery program 122 may prompt, via trusted device 140, for merchant or recipient information in addition to the authentication information discussed above. Furthermore, in the example embodiment, upon authentication, battery program 122 performs payment or transfer from the account of the user of computing device 110 to a merchant account (which may be a client-side account of application 122) or a recipient account. In additional embodiments, application 122 may receive (and verify) the authentication information and further transmit the payment to the specified merchant or recipient.

In the example embodiment, if battery program 122 determines that a trusted device is not within the threshold distance of computing device 110 (decision 204, "NO" branch), battery program 122 identifies an untrusted device that is within a threshold distance of computing device 110 (step 302). In the example embodiment, an untrusted device may include an (untrusted) merchant device, an untrusted user device, or another untrusted device. Furthermore, as stated above an untrusted device is not a trusted device of computing device 110. In the example embodiment, the user of computing device 110 may input an identifier corresponding to the untrusted device into an interface of computing device 110, such as an interface of application 112, (which may then be transmitted over to battery program 122 via network 130. The identifier may correspond to a specific user account located in user database 124. In other embodiments, battery program 122 may automatically identify an untrusted device (such as an untrusted merchant device or untrusted user device) within the threshold distance of computing device 110. In these other embodiments, the untrusted device may correspond to one or more accounts in user database 124, however, in further embodiments, the untrusted device may not correspond with one or more accounts in user database 124. Additionally, in one or more embodiments, in identifying an untrusted device, battery program 122 may identify an untrusted device from a plurality of untrusted devices that are within the threshold distance of computing device 110 based on determining the untrusted device that is the closest in distance to computing device 110.

Battery program 122 creates a reference ID corresponding to an account of the user of computing device 110, and further transmits the reference ID to the untrusted device (step 304). In the example embodiment, as stated above, the reference ID includes information corresponding to an account of the user of computing device 110, and may further include a spending limit (or available amount of transactional currency), a location of computing device 110, along with a location where the amount may be spent (for example, a specific merchant or merchant location). Furthermore, in the example embodiment, battery program 122 may transmit the reference ID in the form of a selectable element (or link), which upon selection, causes a payment page or interface to load that corresponds to the account of the user of computing device 110. In one or more embodiments, the selectable element may be an encrypted link. In other embodiments, battery program 122 may transmit the reference ID to an untrusted device, such as untrusted device 160, which may then be input into an interface of application 162, which causes the payment page or interface corresponding to the account of the user of computing device 110 to load. In this other embodiment, when the reference ID is input into the interface of application 162, application 122 receives the reference ID and communicates the reception of the reference ID with battery program 122. Battery program 122 may then transmit information to untrusted device 160 to cause the payment page/interface corresponding to the account of the user of computing device 110 to load. In the example embodiment, the payment page/interface may include information such as an identification information corresponding to the account of the user of computing device 110, such as a name, or address, and further may include information corresponding to a spending limit, and a specific merchant where the available funds may be utilized. In further embodiments, inputting the reference ID into the interface of application 142 or selecting an element/link corresponding to the reference ID may not cause the payment page to load, and may only cause a message to be transmitted to server 120 requesting authentication for a payment.

Battery program 122 may receive authentication information and further determine if the authentication is successful (decision 306). In the example embodiment, as stated above, the payment page/interface may provide a prompt for certain credentials corresponding to the account of the user of computing device 110 to be input. For example, the payment page/interface displayed on untrusted device 160 may prompt for a user pin or password to be input. Battery program 122 may then cross-reference the input authentication information with information corresponding to the account of the user of computing device 110 in user database 124 to determine if the input authentication information matches the information in user database 124. If battery program 122 determines that the input authentication information does not match the information in user database 124 (authentication is not successful) (decision 306, "NO" branch), battery program 122 may deny access to the funds corresponding to the reference ID (displayed on the payment page/interface), and may further disallow access to the payment page/interface. In other embodiments, battery program 122 may prompt for the authentication information to be re-entered, and then re-evaluate whether the newly input information matches the information in user database 124.

If battery program 122 determines that the input authentication information matches the information in user database 124 (authentication is successful) (decision 306, "YES" branch), battery program 122 transmits payment to a specified merchant or recipient (step 308). In the example embodiment, along with input of the authentication information, battery program 122 may additionally prompt for information regarding the amount of the available amount (the spending limit) desired to be used for the payment. In other embodiments, battery program 122 may upon determining that authentication is successful, transmit payment for the entire amount corresponding to the spending limit. In the example embodiment, battery program 122 may communicate with computing device 110 with regard to a specific merchant for battery program 122 to perform payment to when the battery level of computing device 110 is detected below the threshold level. For example, battery program 122 may receive information corresponding to a specific merchant, or may utilize GPS information or location information to identify that computing device 110 is in a location corresponding to the specific merchant. In other embodiments, battery program 122 may prompt, via untrusted device 160, for merchant or recipient information in addition to the authentication information discussed above. Furthermore, in the example embodiment, upon authentication, battery program 122 performs payment or transfer from the account of the user of computing device 110 to a merchant account (which may be a client-side account of application 122) or a recipient account. In further embodiments, battery program 122 may recognize that the untrusted device is a merchant device, such as merchant device 150, and upon recognition of the untrusted device being a merchant device, battery program 122 may rather than prompting for merchant or recipient information, automatically identify the merchant account corresponding to merchant device 150 as the recipient of the payment. In additional embodiments, application 122 may receive (and verify) the authentication information and further transmit the payment to the specified merchant or recipient account.

Figure 4:
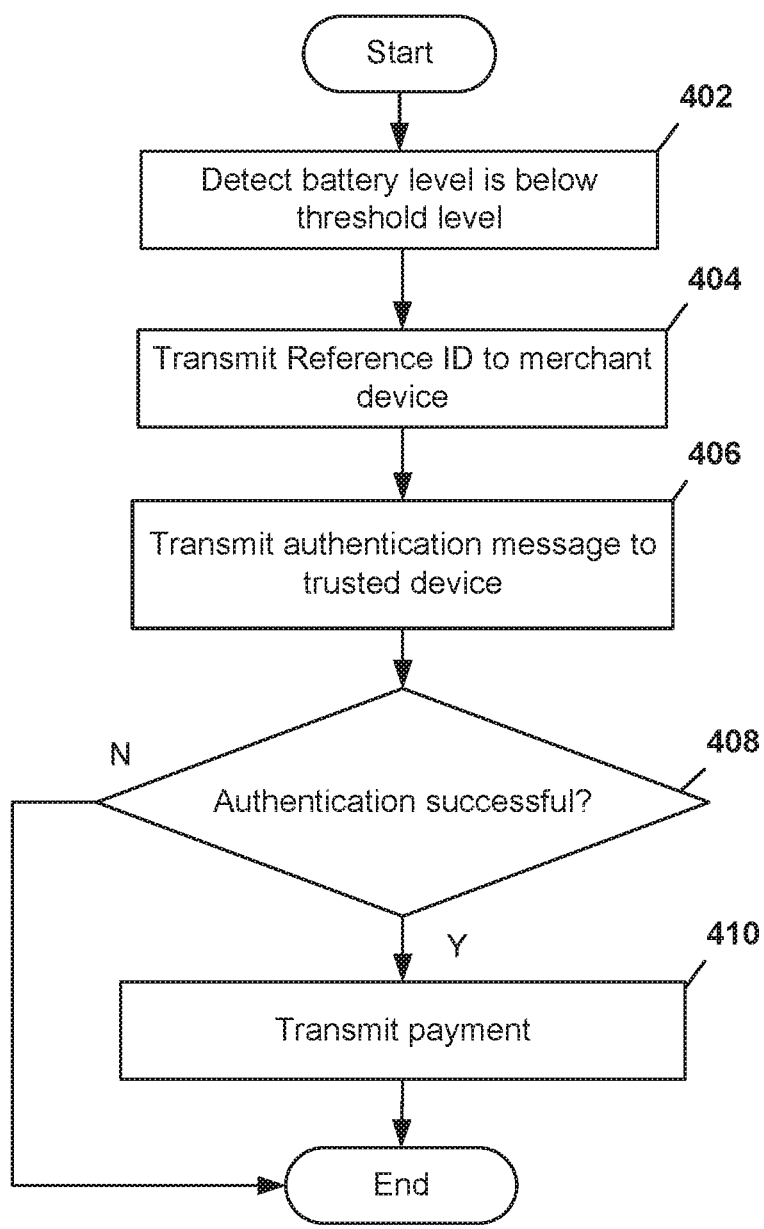
FIG. 4 is a flowchart illustrating the operations of the battery program of FIG. 1 in authenticating a payment by communicating with a trusted device based on detecting that a battery level of a device is below a threshold level, in accordance with an embodiment.

FIG. 4 is a flowchart illustrating the operations of the battery program 122 in authenticating a payment by communicating with a trusted device based on detecting that a battery level of a device is below a threshold level, in accordance with an embodiment.

In the example embodiment, battery program 122 detects that computing device 110 has a battery level that is below a threshold level (step 402). In the example embodiment, battery program 122 may utilize (communicate with) an application, such as application 112 to monitor the battery level of computing device 110. In the example embodiment, the threshold level may be 5%, however, in other embodiments; the threshold level may be a different threshold level.

In the example embodiment, battery program 122 creates a reference ID corresponding to an account of the user of computing device 110, and further transmits the reference ID to a merchant device, such as merchant device 150 (step 404). In the example embodiment, the reference ID includes information corresponding to an account of the user of computing device 110, and may further include a spending limit (or available amount of transactional currency), along with a location where the amount may be spent (for example, a specific merchant or merchant location). Furthermore, in the example embodiment, battery program 122 may transmit the reference ID in the form of a selectable element (or link), which upon selection, causes a payment page or interface to load that corresponds to the account of the user of computing device 110. In one or more embodiments, the selectable element/link is encrypted. In other embodiments, battery program 122 may transmit the reference ID to a merchant device, such as merchant device 150, which may then be input into an interface of application 152, which causes the payment page or interface corresponding to the account of the user of computing device 110 to load. In this other embodiment, when the reference ID is input into the interface of application 142, application 122 receives the reference ID and communicates the reception of the reference ID with battery program 122. Battery program 122 may then transmit information to trusted device 140 to cause the payment page/interface corresponding to the account of the user of computing device 110 to load. In the example embodiment, the payment page/interface may include information such as an identification information corresponding to the account of the user of computing device 110, such as a name, or address, and further may include information corresponding to a spending limit, and a specific merchant where the available funds may be utilized. In further embodiments, inputting the reference ID into the interface of application 142 or selecting an element/link corresponding to the reference ID may not cause the payment page to load, and may only cause a message to be transmitted to server 120 requesting authentication for a payment.

In the example embodiment, battery program 122 transmits an authentication message to a trusted device, such as trusted device 140 via network 130 (step 406). In the example embodiment, trusted device 140 is not within the threshold distance of computing device 110, however, in other embodiments, trusted device 140 may be within the threshold distance of computing device 110. In the example embodiment, battery program 122 identifies that trusted device 140 is a trusted device of computing device 110 by referencing user database 124. Furthermore, in the example embodiment, the authentication message may include information that describes a payment amount, user information of the user of computing device 110, merchant information, and may further include information as to whether a spending limit corresponding to the reference ID has been reached or exceeded. Furthermore, the authentication message provides an option for the user of trusted device 140 to authenticate the payment or to deny the payment.

Battery program 122 receives information from trusted device 140 as to whether the payment has been authenticated (decision 408). If battery program 122 receives information denying the payment (authentication is not successful) (decision 408, "NO" branch), battery program 122 may deny access to the funds corresponding to the reference ID, and may further disallow access to the payment page/interface. In other embodiments, battery program 122 may prompt for the user of trusted device 140 to confirm that access to the funds should be denied, and then re-evaluate based on the received input.

If battery program 122 receives information authenticating (allowing) the payment (authentication is successful) (decision 408, "YES" branch), battery program 122 transmits payment from the account of the user of computing device 110 to an account associated with merchant device 150 (step 410). In the example embodiment, along with prompting the user of trusted device 140 to authenticate the payment, battery program 122 may additionally prompt for authentication with regard to the payment amount (for example, if the payment amount exceeds the spending limit associated with the reference ID). In other embodiments, battery program 122 may upon determining that authentication is successful, automatically transmit payment for the entire amount corresponding to the spending limit. In other embodiments, application 122 may receive the authentication information and further transmit the payment to merchant device 150.

While one or more of the embodiments in the Figures above describe utilizing the steps listed to perform a payment to a merchant, battery program 122 may also perform the steps described above to perform a peer to peer money transfer or a business to business money transfer.

Furthermore, while in the example embodiment battery program 122 is located on server 120, in other embodiments, some or all functionalities of battery program 122 may be performed client-side on computing device 110. For example, a client-side version of battery program 122 may detect that the battery level is below the threshold level, and upon detecting the battery level is below the threshold level, may create a reference ID and transmit the reference ID to another computing device, such as trusted device 140, untrusted device 160, or merchant device 150, as described above. In these other embodiments, upon receiving authentication information, application 122 may transfer the payment to the corresponding merchant or recipient.

In addition, in one or more embodiments, even if a transaction is not performed, upon detection by battery program 122 that computing device 110 has a battery level that is below the threshold level, battery program 122 may transmit a notification to one or more trusted devices, detailing that the battery level of computing device 110 is below the threshold level, and/or detailing a location of the user of computing device 110. Furthermore, in one or more embodiments, the creation of the reference ID may further include a creation of a pin or a password. For example, during the creation of the reference ID, the user of computing device 110 or the user of a trusted device of computing device 110 may be prompted to create a pin or password for use in conjunction with the reference ID to perform a transaction, as described above.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

FIG. 5 depicts a block diagram of components of computing devices contained in battery system 100 of FIG. 1, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, battery program 122, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
a non-transitory memory; and
one or more hardware processors coupled to the non-transitory memory and configured to read instructions from the non-transitory memory to cause the system to perform operations comprising:
receiving, from a first computing device of a user, a request for performing a payment transaction for a recipient using a user account associated with the user;
detecting that a battery level of the first computing device is below a threshold level;
in response to the detecting, determining that a second computing device is within a threshold distance of the first computing device, wherein the second computing device is not associated with the recipient and the user account;
in response to the determining, creating a reference identifier for the payment transaction and transmitting information corresponding to the reference identifier to the second computing device, wherein the information enables the second computing device to access the user account;
transmitting, to the second computing device, a request for authentication information associated with the user of the first computing device;

receiving the authentication information from the second computing device; and processing the payment transaction using the user account based on the reference identifier and the authentication information received from the second computing device.

2. The system of claim 1, wherein the second computing device is a trusted device registered to be associated with the first computing device.

3. The system of claim 1, wherein the second computing device is not a trusted device associated with the first computing device.

4. The system of claim 1, wherein the operations further comprise receiving the reference identifier along with the authentication information from the second computing device.

5. The system of claim 1, wherein the information transmitted to the second computing device includes a selectable element for accessing the user account.

6. The system of claim 5, wherein the request for the authentication information is transmitted to the second computing device in response to detecting a selection of the selectable element.

7. The system of claim 1, wherein the operations further comprise determining that the received authentication information matches stored authentication information corresponding to the user of the first computing device.

8. The system of claim 1, wherein the reference identifier includes information corresponding to the user account of the user of the first computing device, and information associated with a spending limit.

9. A method, comprising:
receiving, from a first computing device of a user, a request for performing a transaction for a recipient using a user account associated with the user;
detecting that a battery level of the first computing device is below a threshold level;
in response to the detecting that the battery level of the first computing device is below the threshold level, creating a reference identifier and transmitting information corresponding to the reference identifier to a second computing device, wherein the second computing device is not associated with the recipient and the user account;
in response to detecting that the second computing device is accessing the user account using the information corresponding to the reference identifier, transmitting, to the second computing device, a request for authentication information associated with the user of the first computing device;
receiving the authentication information from the second computing device; and
processing the transaction using the user account associated with the user of the first computing device based on the authentication information received from the second computing device.

10. The method of claim 9, further comprising determining that the second computing device is within a predetermined distance from the first computing device.

11. The method of claim 9, wherein the reference identifier includes information corresponding to the user account and information associated with a spending limit.

12. The method of claim 9, further comprising determining that the received authentication information matches stored authentication information associated with the user.

13. The method of claim 9, further comprising receiving the reference identifier from the first computing device.

14. The method of claim 9, wherein the information corresponding to the reference identifier includes a selectable element for accessing the user account.

15. The method of claim 14, wherein the request for the authentication information is transmitted to the second computing device in response to detecting a selection of the selectable element.

16. A non-transitory machine-readable medium stored thereon machine-readable instructions executable to cause a machine to perform operations comprising:
receiving, from a first computing device of a user, a request for performing a transaction for a recipient using a user account associated with the user;
detecting that a battery level of the first computing device is below a threshold level;
in response to the detecting, determining that a second computing device is within a threshold distance of the first computing device, wherein the second computing device is not associated with the recipient and the user account;
in response to the determining, creating a reference identifier and transmitting information corresponding to the reference identifier to the second computing device, wherein the information enables the second computing device to access the user account;
transmitting, to the second computing device, a request for authentication information associated with the user of the first computing device;
receiving the authentication information from the second computing device; and
processing the transaction using the user account associated with the user of the first computing device based on the reference identifier and the authentication information.

17. The non-transitory computer-readable medium of claim 16, wherein the second computing device is a trusted device registered to be associated with the first computing device.

18. The non-transitory computer-readable medium of claim 16, wherein the second computing device is not associated with the user.

19. The non-transitory computer-readable medium of claim 16, wherein the information comprises a link for accessing the user account, and wherein the request for the authentication information is transmitted to the second computing device in response to detecting a selection of the link by the second computing device.

20. The non-transitory computer-readable medium of claim 16, wherein the operations further comprise determining that the received authentication information matches stored authentication information corresponding to the user of the first computing device.

* * * * *